Patented Apr. 1, 1930

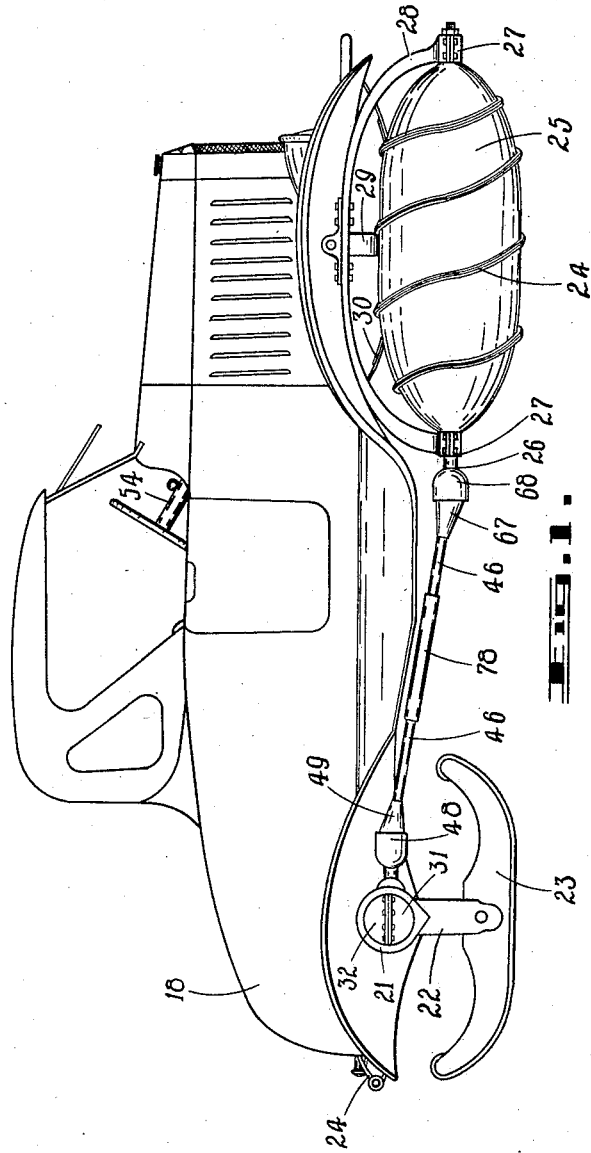

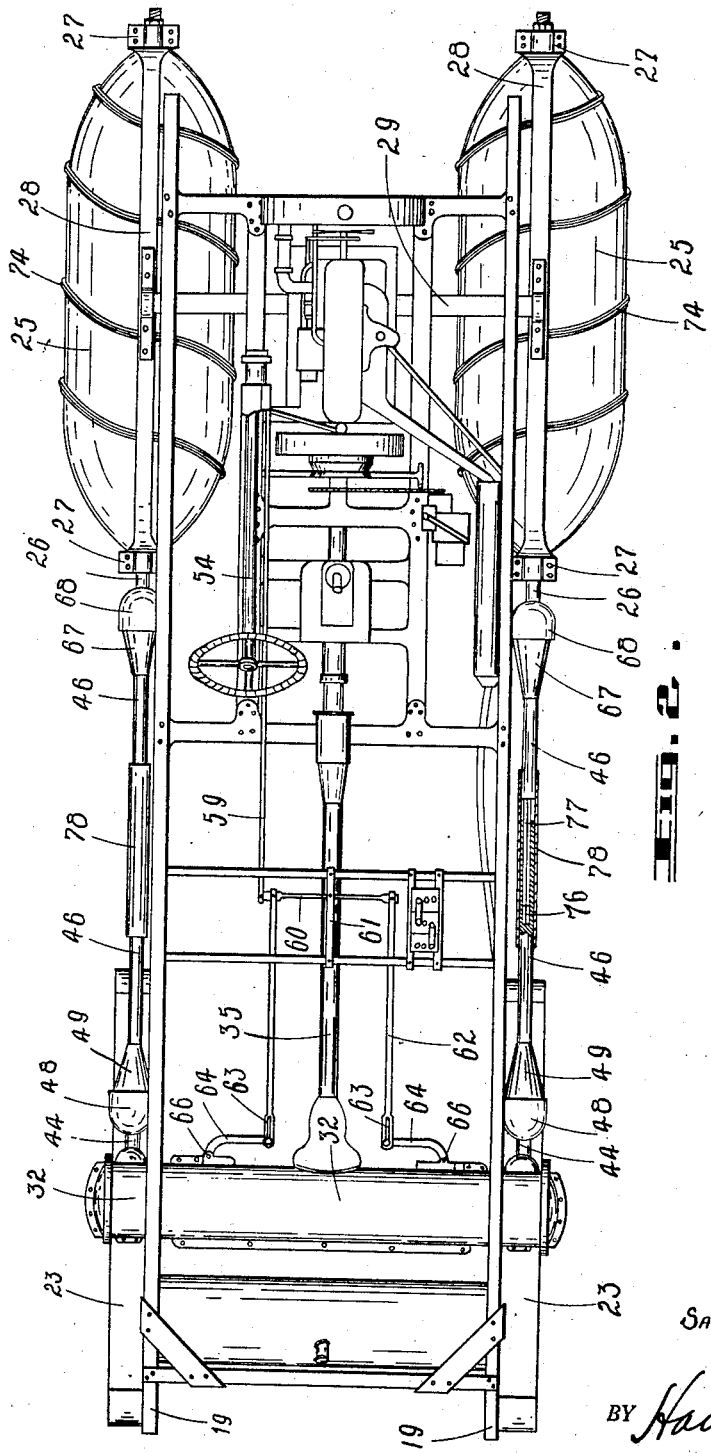

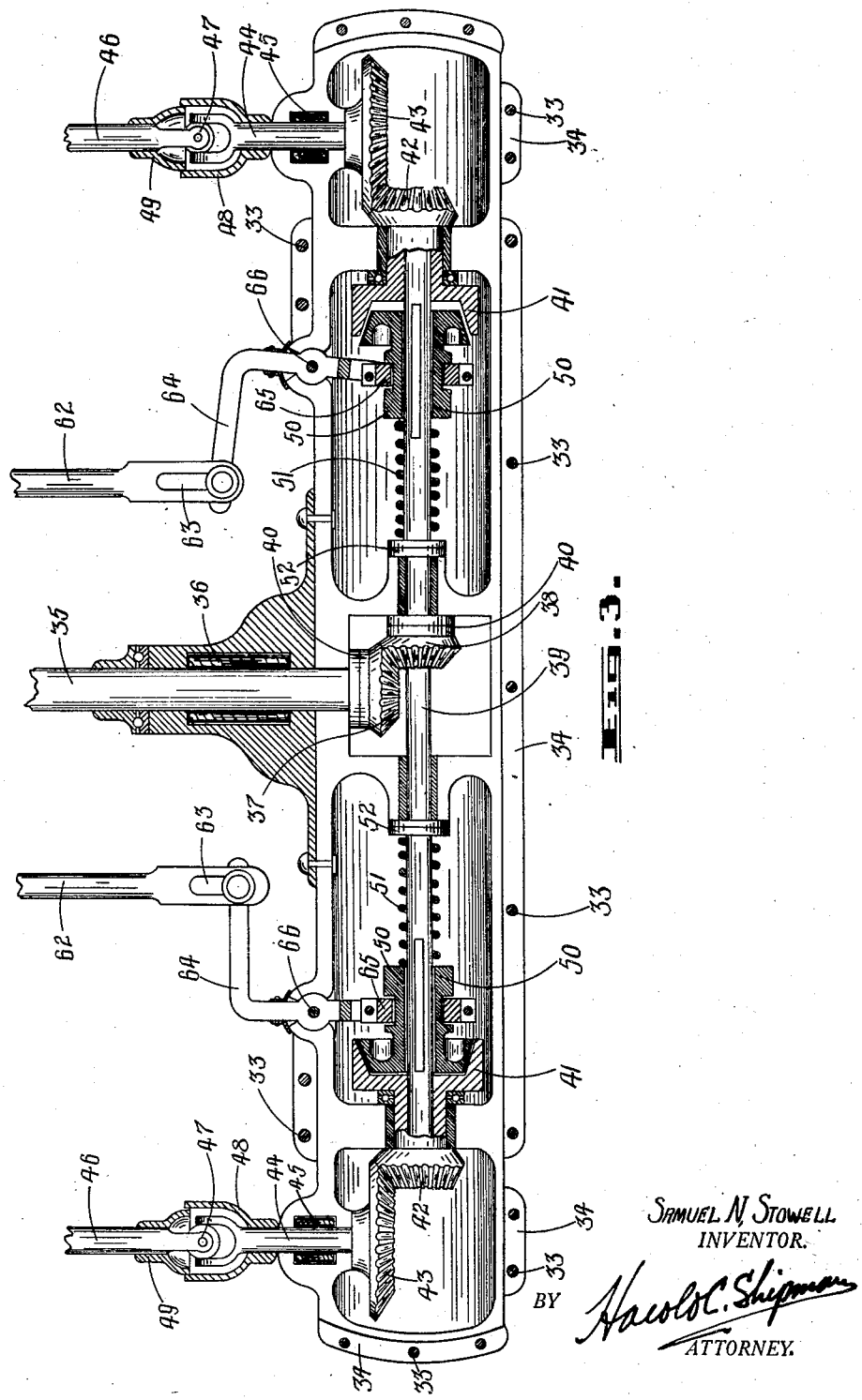

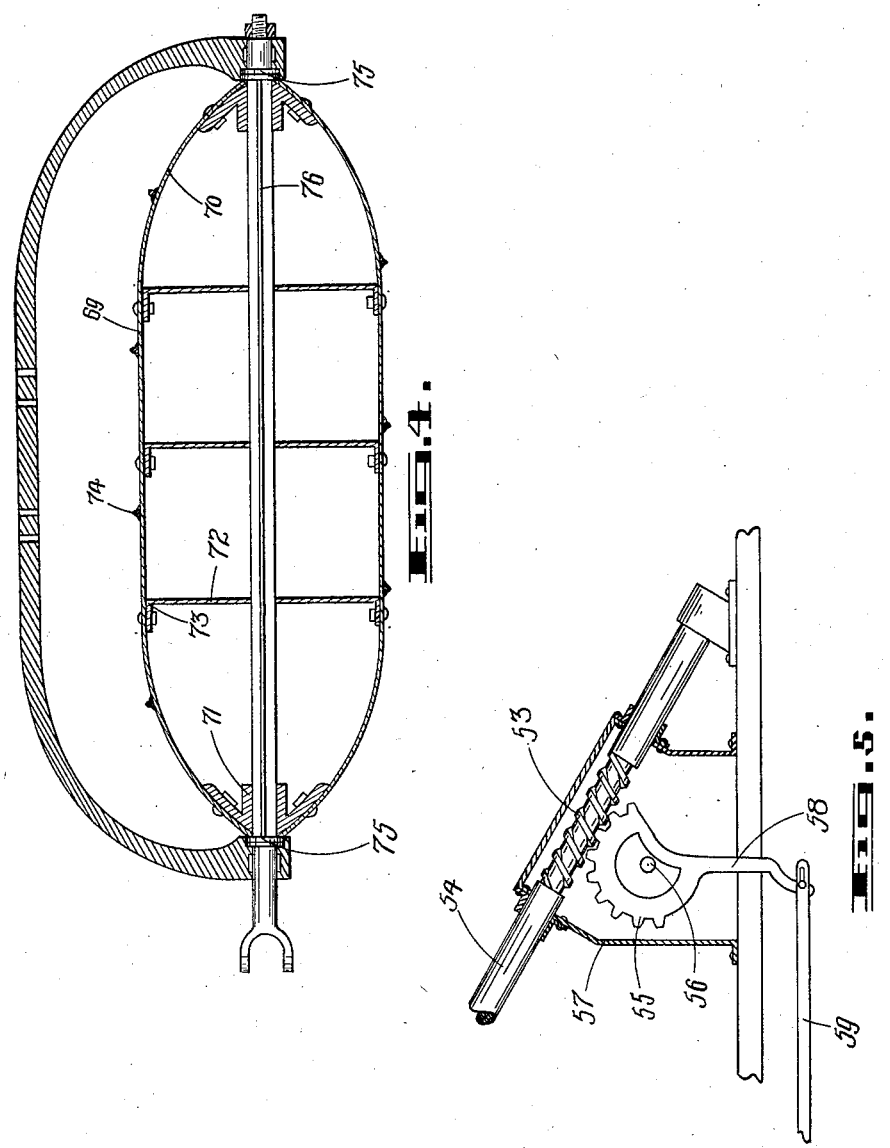

1,753,160

UNITED STATES PATENT OFFICE

SAMUEL N. STOWELL, OF YUBA CITY, CALIFORNIA, ASSIGNOR OF ONE-FOURTH TO ESTHER A. E. RATTRAY, OF MARYSVILLE, CALIFORNIA

AUTO SLED

Application filed March 5, 1929. Serial No. 344,397.

The present invention relates to improvements in auto sleds and particularly refers to the traction mechanism, which may be used in connection with automobiles, trucks, tractors and the like, the principal object of which is to provide a device of the character described, which will have a most efficient traction means.

A further object is to provide a device which may be attached to the ordinary auto chassis to convert the vehicle into an auto sled for winter use.

With these and other objects in view, the invention consists in the construction, combination and arrangement of parts as will be hereinafter fully described, illustrated in the accompanying drawings and pointed out in the claim hereunto appended.

Fig. 1 is a side elevation of a roadster automobile, embodying my invention.

Fig. 2 is a top plan view of the chassis with various embodiments of my invention shown in combination therewith.

Fig. 3 is a longitudinal section of the differential housing, illustrating the gearing, driving and controlling members as supported therein.

Fig. 4 is a longitudinal section view of one of the traction drums.

Fig. 5 is a detail of the steering rod mechanism.

The numeral 18 designates the body of the vehicle, which may be of any style desired. The chassis 19 is of the ordinary construction and has a specially designed differential disposed beneath the rear end thereof, which will be referred to hereinafter. The standards 22 support the differential housing 21. These standards 22 are pivotally mounted on the runners 23. The rear of the chassis is supported on springs 24, the same being suitably attached on the differential housing. The traction members 25, hereinafter designated as the rotary drums, are disposed on each side at the front end of the chassis and are mounted on a shaft 26, journalled in bearings 27 formed in the opposite ends of the semi-elliptical rocker arms 28. An axle 29 connects the rocker arms 28. Springs 30 are pivotally mounted on the chassis 19 and have connected thereto the axle 29.

The differential is constructed in two sections 32 upper and 31 lower. They are fastened together by bolts 33 disposed in the apertured flanges 34 configurated on the said sections. The main drive shaft 35, from the motor, is journalled centrally in the differential housing and rotates on roller bearings 36 disposed therein. A mitre pinion 37 is mounted on the inner end of the main drive shaft and meshes with a mitre pinion 38, mounted on the transverse drive shaft 39 journalled in the differential housing. Ball races 40 may be disposed behind each mitre pinion to prevent cutting.

Mounted on each end of the horizontal drive shaft 39 are female clutch members 41, having integral therewith a bevel pinion 42 on the outer end thereof. These bevel pinions 42 mesh with and drive bevel gears 43 mounted on stub shafts 44 journalled in the differential housing on roller bearings 45. The end of each stub shaft 44 is universally connected as at 47 to its respective drive shaft 46 to rotate its respective drum 25. These universal joints are housed in by casings 48 and 49 mounted on shafts 44 and 46 respectively. Male clutch members 50 are slidably mounted in keyed relationship with the transverse drive shaft 39 and are adapted to co-act with their respective female clutches 41. These male clutches are tensionally held in engagement with the female clutches by coil springs 51, which have their ends seated in ball races 52 disposed on the transverse drive shaft 39.

The turning of the steering wheel controls these clutches 50. The worm gear 53 is fixedly retained on the steering rod 54 and actuates the segment gear 55 mounted on a shaft 56 carried in the bracket 57 suitably supported from the chassis 19. Projecting from the lower portion of the segment gear 55 is an arm 58, which is pivotally connected to the bifurcated end of the shaft 59. The opposite end of this shaft is pivotally connected to a lever member 60, which is centrally pivoted on the bracket 61. Pivotally connected to each end of this lever member 60 are connecting rods 62. The rear ends of said rods are flattened and provided with slots 63. The ends of these connecting rods engage with the clutch operating bell cranks 64. These bell cranks are forked at their inner ends and pivotally engage the collars 65 disposed about the clutch members 50 in the annular groove cut in each of said clutch members. The bell cranks are pivotally mounted in the differential housing as at 66.

The drive shafts 46 are universally connected to the rear ends of their respective shafts 26 on which the drums are mounted. These universal connections are housed by casings 67 and 68. The drums 25 are composed of cylindrical casings 69, ends 70 elliptically converging to end supports 71 which act as bearings mounted on the shaft 26. The drum is strengthened by spaced disc members 72, having flanges 73 riveted to the cylindrical casing 69 of the drum. The shaft 26 passes centrally therethrough. Spiral tread members 74 are disposed about the drums 25 for traction. Ball races 75 may be disposed at each end of the drums to prevent the same cutting the bearings 27.

The drive shafts 46 are broken, one part having a central square opening 76, in which reciprocates a square extension 77 of the other part. These portions of shafts 46 are housed in by cylindrical casings 78. It is obvious that the function of this extension device is that when the auto sled passes over rough surfaces the front or rear will lift or fall, thus necessitating the telescopic movement of drive shafts 46.

The mode of operation is as follows: Upon actuation of the engine, the main drive shaft 35 is rotated and rotates the transverse drive shaft 39 by means of mitre pinions 37 and 38. The power is transmitted to the rotary drums by drive shafts 46 rotated through the medium of the bevel pinions 42 and bevel gears 43. The spiral tread members 74, disposed about the revolving drums 25, draw the auto sled ahead. When it is desired to turn, the steering wheel is turned and actuates the segmental gear 55, which in turn shoves back or draws forward shaft 59. This shaft actuates the lever member 60. When this lever is actuated, the connecting rods 62 actuate the male clutch members 50 through the medium of the bell cranks 64 and collars 65. The slots 63 in the rear end of the connecting rods 62 will permit one rod to be moved back relative to its connection with its respective bell crank 64, without disturbing the operative connection on this side, while the connecting rod on the opposite side may be moved forward to disengage the operative connection on this side.

The foregoing specification and annexed drawings disclose the preferred embodiment of my invention, but it is to be understood that minor changes may be resorted to in the commercial adaptation of my invention without departing from the scope of the invention as hereinafter claimed.

What I claim as new is:

In an auto sled of the character described, comprising in combination a chassis; runners supporting the rear end of said chassis; rotatably journalled drums supporting the forward end of said chassis; a differential housing supported from the rear end of said chassis; a transverse shaft journalled in said housing; a main drive shaft connecting from a motor and having one end geared to transmit driving power to said transverse shaft; a stub drive shaft supported in each end of said housing; a telescopic drive shaft connection intermediate its respective drum and its respective stub drive shaft and having a universal connection therewith; a clutch mechanism carried at each end of said transverse shaft; a drive connection between the stationary portion of each of said clutch members and its respective stub drive shaft; a movable portion of each of said clutch members being mounted in reciprocal keyed relationship to said transverse shaft and normally in engaged position and a means for reciprocating last said portions individually without disengaging the other of said portions.

In testimony whereof, I affix my signature.

SAMUEL N. STOWELL.